United States Patent
Missale

(10) Patent No.: US 11,748,987 B2
(45) Date of Patent: Sep. 5, 2023

(54) METHOD AND SYSTEM FOR PERFORMING CONTENT-AWARE DEDUPLICATION OF VIDEO FILES

(71) Applicant: Larsen & Toubro Infotech Ltd, Edison, NJ (US)

(72) Inventor: John V Missale, Secaucus, NJ (US)

(73) Assignee: Larsen & Toubro Infotech Ltd, Edison, NJ (US)

(*) Notice: Subject to any disclaimer, the term of this patent is extended or adjusted under 35 U.S.C. 154(b) by 375 days.

(21) Appl. No.: 17/234,783

(22) Filed: Apr. 19, 2021

(65) Prior Publication Data
US 2022/0335245 A1 Oct. 20, 2022

(51) Int. Cl.
| | | |
|---|---|---|
| *G06V 20/40* | (2022.01) | |
| *G06F 16/783* | (2019.01) | |
| *G06F 16/71* | (2019.01) | |
| *G06V 30/10* | (2022.01) | |
| *G06F 18/22* | (2023.01) | |
| *G06N 7/01* | (2023.01) | |
| *G06V 10/74* | (2022.01) | |

(52) U.S. Cl.
CPC .............. *G06V 20/46* (2022.01); *G06F 16/71* (2019.01); *G06F 16/7837* (2019.01); *G06F 16/7847* (2019.01); *G06F 18/22* (2023.01); *G06N 7/01* (2023.01); *G06V 10/74* (2022.01); *G06V 20/41* (2022.01); *G06V 30/10* (2022.01)

(58) Field of Classification Search
CPC ........ G06V 20/46; G06V 10/74; G06V 20/41; G06V 30/10; G06F 16/71; G06F 16/7837; G06F 16/7847; G06F 18/22; G06N 7/01; G06N 3/045; G06N 20/00
See application file for complete search history.

(56) References Cited

U.S. PATENT DOCUMENTS

| | | | |
|---|---|---|---|
| 8,345,769 B1* | 1/2013 | Diard ..................... | G06V 20/49 725/38 |
| 11,120,293 B1* | 9/2021 | Rosenzweig ........... | G06T 7/215 |
| 11,417,099 B1* | 8/2022 | Hillman Beauchesne ................. G06V 20/49 | |
| 11,429,658 B1* | 8/2022 | Richter ................. | G06F 16/483 |
| 11,599,856 B1* | 3/2023 | Stewart ................ | G06V 10/761 |
| 2003/0122860 A1* | 7/2003 | Ino ....................... | G11B 27/105 707/E17.028 |

(Continued)

*Primary Examiner* — Aaron W Carter
(74) *Attorney, Agent, or Firm* — Farrell Patent Law PC; Mark Farrell

(57) ABSTRACT

The invention relates to a method and system for performing content-aware deduplication of video files and content storage cost optimization. The method includes pre-processing video files into a plurality of groups of video files based on type of genre and run-time of a video. The genre of a plurality of video files is automatically detected using a sliding-window similarity index, which is utilized to improve accuracy of genre detection. After the pre-processing step, each group of the plurality of groups of video files are simultaneously fed into a plurality of machine learning (ML) instances and models which measure a degree of similarity corresponding to each group of video files by detecting one or more conditions that exists in the video files. The one or more conditions are detected by performing deep inspection of content in the video files using hash-based active recognition of objects.

41 Claims, 6 Drawing Sheets

(56) References Cited

U.S. PATENT DOCUMENTS

| | | | | |
|---|---|---|---|---|
| 2009/0022472 A1* | 1/2009 | Bronstein | .............. | H04N 5/783 |
| | | | | 386/278 |
| 2009/0263014 A1* | 10/2009 | Zhang | ................... | G06V 10/56 |
| | | | | 382/165 |
| 2011/0109742 A1* | 5/2011 | Laganiere | ............. | G06V 20/52 |
| | | | | 348/143 |
| 2013/0297745 A1* | 11/2013 | Denoual | ........... | H04N 21/4622 |
| | | | | 709/219 |
| 2014/0270388 A1* | 9/2014 | Lucey | .................... | G06V 20/30 |
| | | | | 382/107 |
| 2015/0227436 A1* | 8/2015 | Wilson | ............... | G06F 11/1453 |
| | | | | 707/692 |
| 2016/0358632 A1* | 12/2016 | Lakhani | ................. | H04N 9/802 |
| 2017/0323018 A1* | 11/2017 | Angelova | ......... | G06Q 30/0277 |
| 2018/0005037 A1* | 1/2018 | Smith, IV | ........ | H04N 21/23439 |
| 2018/0239982 A1* | 8/2018 | Rutschman | ............ | H04N 23/60 |
| 2019/0236371 A1* | 8/2019 | Boonmee | ............. | G06V 10/764 |
| 2021/0344498 A1* | 11/2021 | Perunov | ................. | H04L 63/08 |
| 2022/0215649 A1* | 7/2022 | Yao | ........................ | G06V 20/49 |
| 2022/0335245 A1* | 10/2022 | Missale | ................. | G06V 30/10 |

\* cited by examiner

METHOD AND SYSTEM FOR PERFORMING CONTENT-AWARE DEDUPLICATION OF VIDEO FILES

FIELD OF THE INVENTION

The invention generally relates to a method and system for performing content-aware deduplication of video files. Specifically, the invention relates to a method and system for performing content-aware deduplication of video files at a high deduplication ratio based on deep inspection of content in the video files, and enabling content storage cost optimization on-premise and in the cloud by using specific models that detect various conditions in the way content is stored.

BACKGROUND OF THE INVENTION

Content deduplication and efficient storage are age-old issues for content providers. With the evolution of cloud architecture, infrastructure and machine learning, various solutions are available for efficient content deduplication and storage. However, it is important to understand that a content provider that is considering the migration of content from on-premise to the cloud must remove duplicate content that has been accumulating for many years as well as optimize storage costs. Further, there is a need to classify the content and extract valuable metadata to provide increased search capability and improve data correlation to operations.

Erstwhile techniques face challenges while addressing these requirements. In these techniques, machine learning is utilized during and after the migration process and a proprietary cloud platform is used for final storage. The first step is to decide how to move the content, appliance or virtual private network (VPN). Appliances were used to move content quickly in order to begin testing metadata extraction and then the content was moved by VPN to complete the full migration. Further, hash-tag comparisons were used to accomplish this. Although this process may be beneficial for data, it does not yield a high deduplication ratio for video content. The highest success rate for video deduplication using traditional fixed-sized de-duplication techniques such as, but not limited to, hash-tag comparison has only been 42% as it does not account for other differences in the video copies, and fail to identify duplicate content because of the differences in the video copies.

Furthermore, editors, producers and content operators fail to properly identify the metadata associated with produced content such as, but not limited to, the versions from the original work, language, directors, actors and technical data. Also, the techniques employed do not perform content-aware deduplication that can detect this information and write it back to the content management system so that the content provider has an accurate record.

Further, in order to detect similarity between videos and to identify duplicates, a video is hashed, and the hashes are compared to determine if there is a match. For instance, in the case of a two-hour movie recorded at a High Definition (HD) resolution of 15 Mb/s, the file size is 6.75 terabytes (TB). The hash of this file is 25% of the file size which equates to 1.6875 TB. This increases the storage required for the hash.

Thus, there exists a need for a method and system for detecting duplicate copies of video files at a high deduplication ratio based on deep inspection of content in the video files and performing content-aware deduplication for saving storage cost on-premise and in the cloud.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
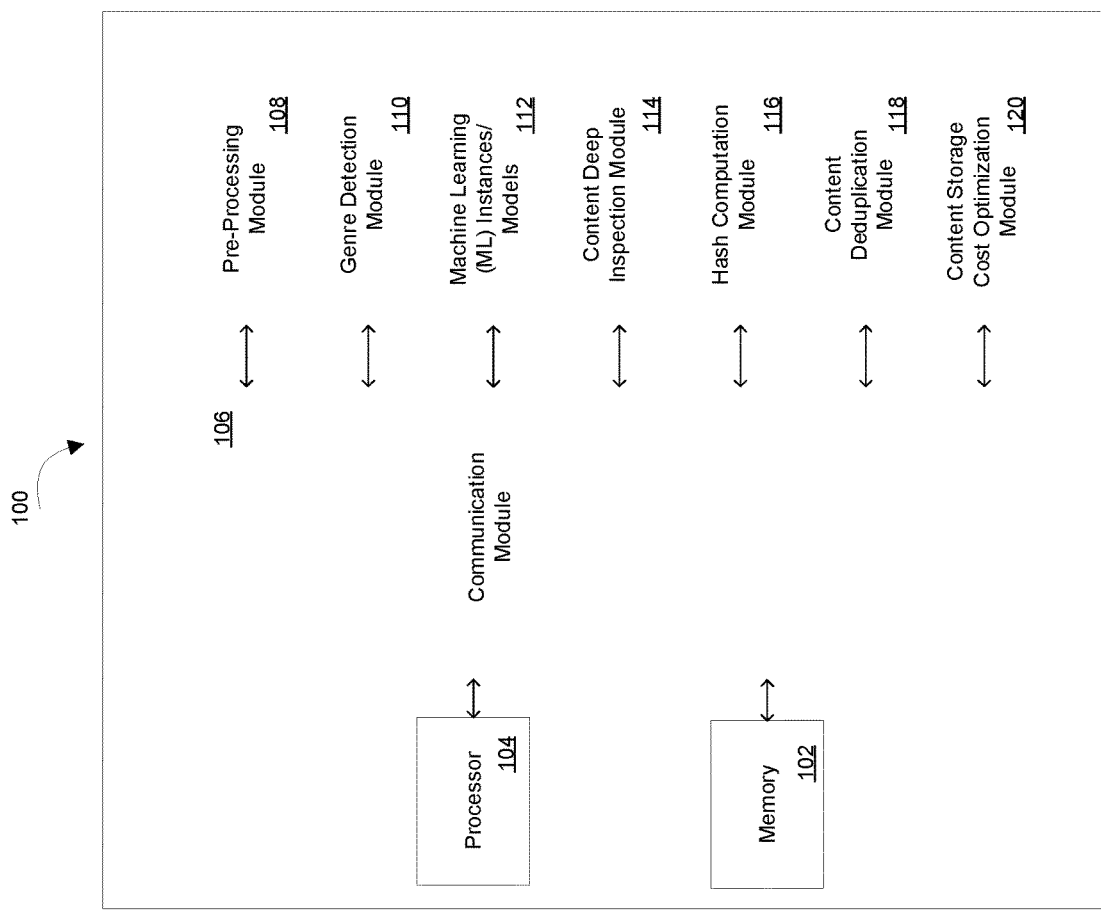
FIG. 1 illustrates a system for performing content-aware deduplication of video files in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the invention, it should be observed that the embodiments reside primarily in combinations of method steps and system components for performing content-aware deduplication of video files at a high deduplication ratio based on deep inspection of content in the video files, and enabling content storage cost optimization on-premise and in the cloud by using specific models that detect various conditions in the way content is stored.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Various embodiments of the invention disclose a method and system for performing content-aware deduplication of video files. The method includes pre-processing video files into a plurality of groups of video files based on type of genre and run-time of a video. The video files can be, but need not be limited to, movie files, and the genre can be, but need not be limited to, Drama, Horror and Western. The genre of a plurality of video files is automatically detected using a sliding-window similarity index, which is utilized to improve accuracy of genre detection. In an embodiment, the genre is automatically detected using Multi-label Logistic Regression. After the pre-processing step, each group of the plurality of groups of video files are simultaneously fed into a plurality of machine learning (ML) instances and models. The plurality of ML instances and models measure a degree of similarity corresponding to each group of video files by detecting one or more conditions that exist in the video files. The one or more conditions can be, but need not be limited to, additional audio content, different languages, different textual captions, recording with different encoding equipment, different frame rates and resolutions, different scene environmental locations, different scene order, different intent, blurred background, deleted frames, inserted frames, background hidden by the addition of objects, scenes with different spectral composition, different amounts of participation of a celebrity or object, and different background audio. The one or more conditions are detected by performing deep inspection of content in the video files using hash-based active recognition of objects. Further, content storage cost optimization is achieved by organizing content maintenance for unorganized content by separating said content based on one or more categories of the video files and detecting original video files from a given set of video files.

FIG. 1 illustrates a system 100 for performing content-aware deduplication of video files in accordance with an embodiment of the invention.

As illustrated in FIG. 1, system 100 comprises a memory 102 and a processor 104 communicatively coupled to memory 102. Memory 102 and processor 104 further communicate with various modules of system 100 via a communication module 106.

Communication module 106 may be configured to transmit data between modules, engines, databases, memories, and other components of system 100 for use in performing the functions discussed herein. Communication module 106 may include one or more communication types and utilizes various communication methods for communication within system 100.

System 100 includes a pre-processing module 108 for pre-processing video files into a plurality of groups of video files based on type of genre and run-time of a video. The video files can be, but need not be limited to, movie files, and the genre can be, but need not be limited to, Drama, Horror and Western. The genre of a plurality of video files is automatically detected via a genre detection module 110 using a sliding-window similarity index, which is utilized to improve accuracy of genre detection. In an embodiment, the genre is automatically detected using Multi-label Logistic Regression in genre detection module 110.

After the pre-processing step, each group of the plurality of groups of video files are simultaneously fed into a plurality of ML instances and models 112. Plurality of ML instances and models 112 measure a degree of similarity corresponding to each group of video files by detecting one or more conditions that exist in the video files.

In accordance with an embodiment, a degree of similarity is measured based on time code start and end points using metadata to detect the one or more conditions and visually verify the detected one or more conditions.

In accordance with another embodiment, a degree of similarity is measured based on additional audio data using audio fingerprinting, decoding and similarity.

In accordance with yet another embodiment, a degree of similarity is measured based on different languages using Optical Character Recognition (OCR).

In accordance with yet another embodiment, a degree of similarity is measured based on different textual captions by, detecting the text using OCR, vectorizing the detected text, and comparing the vectorized text using cosine similarity.

In accordance with yet another embodiment, a degree of similarity is measured on video files that are recorded with different encoding equipment using metadata.

In accordance with yet another embodiment, a degree of similarity is measured based on different frame rates and resolutions using metadata.

In an embodiment, a threshold of plurality of ML instances and models 112 are dynamically fine-tuned for detecting the one or more conditions for each type of genre. The one or more conditions can be, but need not be limited to, additional audio content, different languages, different textual captions, recording with different encoding equipment, different frame rates and resolutions, different scene environmental locations, different scene order, different intent, blurred background, deleted frames, inserted frames, background hidden by the addition of objects, scenes with different spectral composition, different amounts of participation of a celebrity or object, and different background audio.

The one or more conditions are detected by performing deep inspection of content in the video files using hash-based active recognition of objects using a content deep inspection module 114. Such deep inspection of content is performed using techniques such as, but not limited to, reading metadata of the video files, frame hashing and similarity check.

In an embodiment, content deep inspection module 114 detects scenes with celebrities, objects, captions, language, and perceptual differences in the video files, automatically detects and removes artifacts in a video file. The artifacts can be, but need not be limited to, black frames, color bars, countdown slates and any abnormalities that may cause visual degradation in video quality. Examples of object detection using text recognition include, but are not limited to, identification of number plate, a type and color of a vehicle detected on a security camera footage over months/days of video data and many other similar possibilities. This logic of detecting text may be extended to many other areas such as, but not limited to, identifying vehicles, clothes brands, city/country identifiers, and specific country landmarks.

In another embodiment, content deep inspection module 114 extracts metadata from a video file and writes the metadata back to a Media Asset Management (MAM)

system to improve the descriptive taxonomy and search capability of the MAM system.

The deep inspection of content is also used for efficient and automatic content identification and verification across a content supply chain to greatly improve the identification and performance of video content of a video file.

In yet another embodiment, content deep inspection module 114 verifies if any inserted content in a video file has up to date usage rights or whether additional rights need to be obtained by a content provider for distribution.

In yet another embodiment, content deep inspection module 114 detects and classifies disaster conditions in live video in the video files to trigger specific first responders' attention.

In yet another embodiment, content deep inspection module 114 detects semantic conditions such as, but not limited to, emotion and behavior (for example, laughing, crying, sadness, tiredness, intention, etc.), in the video files.

The following table illustrates the detected conditions, technology/algorithms used for detecting these conditions and the deployment hardware required on cloud platforms for enabling the detection in accordance with various embodiments.

TABLE

| Detected Conditions | Technology/Algorithms | Deployment Hardware on Cloud Platforms |
| --- | --- | --- |
| Same videos have been recorded with different commercial/advertisement content | Scene Detection and Speech to Text using MD5 hash | Compute engine with CPU, GPU, Memory, Storage device |
| Different transcoding formats | FFmpeg - Similarity is based only on video content | Compute engine with CPU, GPU, Memory, Storage device |
| Differences in video frame rate/resolution | FFmpeg and ML - Similarity is based only on video content irrespective of different language in audio. Text transcription + language detected is persisted | Compute engine with CPU, optional GPU, Memory, Storage device |
| Differences in time code start and end points | Scene Detection + timecode comparison | Compute engine with CPU, GPU, Memory, Storage device |
| Audio segments placed in between video segments | Scene Detection and Speech to Text | Cloud Speech API |

Further, system 100 includes a hash computation module 116 for computing hashes for detecting the degree of similarity based on Hamming Distance using MD5 File Hash. The hashes are recorded on the Blockchain to prevent black box attacks using Generative Adversarial Networks (GANs).

System 100 then performs deduplication of video files based on the degree of similarity and the computed hashes using a content deduplication module 118.

Finally, system 100 includes a content storage cost optimization module 120 which utilizes the content aware deduplication of video files to optimize storage cost by organizing content maintenance for unorganized content by separating said content based on one or more categories of the video files and detecting original video files from a given set of video files. A category can be, but need not be limited to, movies, episodes/serials, trailers, user generated content, video blogs/video logs (vlogs), wildlife films, and advertisements (ads).

Figure 2:
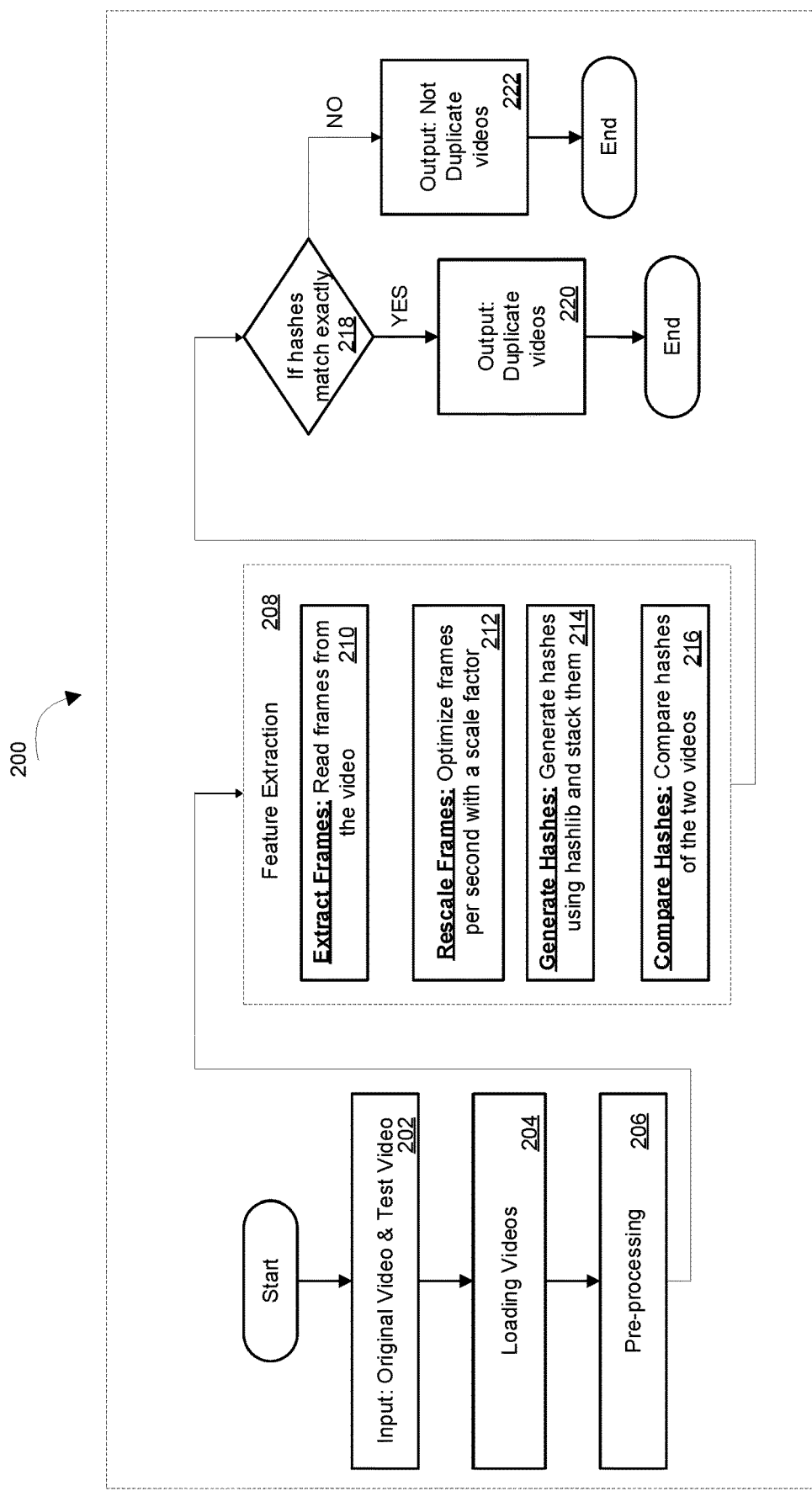
FIG. 2 illustrates a flowchart of a process for detecting duplicate videos in accordance with an embodiment of the invention.

FIG. 2 illustrates a flowchart of a process 200 for detecting duplicate videos in accordance with an embodiment of the invention.

As illustrated in FIG. 2, at 202, an original video and a test video are input. At 204, the videos are loaded and subjected to pre-processing at 206.

At 208, feature extraction is performed on the videos. The feature extraction process includes the following: reading frames from the videos 210, optimizing frames per second with a scale factor 212, generating hashes using hashlib and stacking them 214, and comparing hashes of the two videos 216.

At 218, if the hashes of the videos exactly match, then the videos are duplicate videos (220), else there are no duplicate videos (222), and the process ends.

Figure 3:
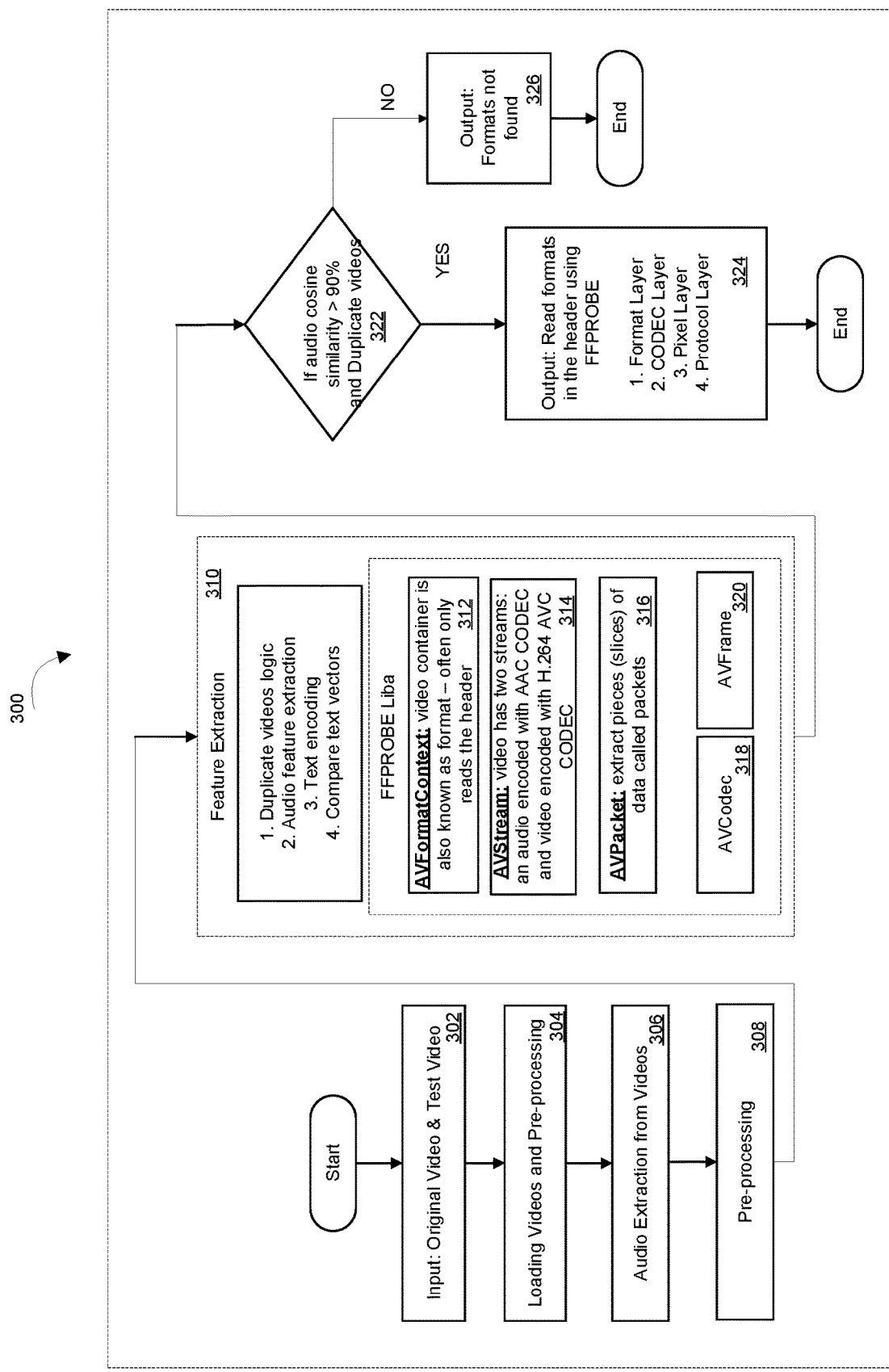
FIG. 3 illustrates a flowchart of a process for detecting duplicate videos where a same video has been recorded with different commercial/advertisement (ad) content, in accordance with an embodiment of the invention.

FIG. 3 illustrates a flowchart of a process 300 for detecting duplicate videos where a same video has been recorded with different commercial/ad content, in accordance with an embodiment of the invention.

As illustrated in FIG. 3, at 302, an original video and a test video are input. At 304, the videos are loaded and pre-processed. At 306, audio is extracted from the videos, and the videos (minus audio) are subjected to pre-processing at 308.

At 310, feature extraction is performed on the videos using techniques such as, but not limited to, duplicate video logic, audio feature extraction, text encoding and comparing text vectors.

Further, FFPROBE Liba is utilized for identifying the following attributes:

AVFormatContext 312: A video container is also known as format. The function only reads the header.

AVStream 314: A video has two streams: an audio encoded with AAC CODEC and video encoded with H.264 AVC CODEC.

AVPacket 316: The function extracts pieces (slices) of data called packets.

AVCodec 318 and AVFrame 320 are created.

At 322, if audio cosine similarity is greater than 90% and duplicate videos are present, the formats in the header are read using FFPROBE, of a format layer, CODEC layer, Pixel Layer and Protocol layer (324), else, it is determined that formats are not found (326).

Figure 4:
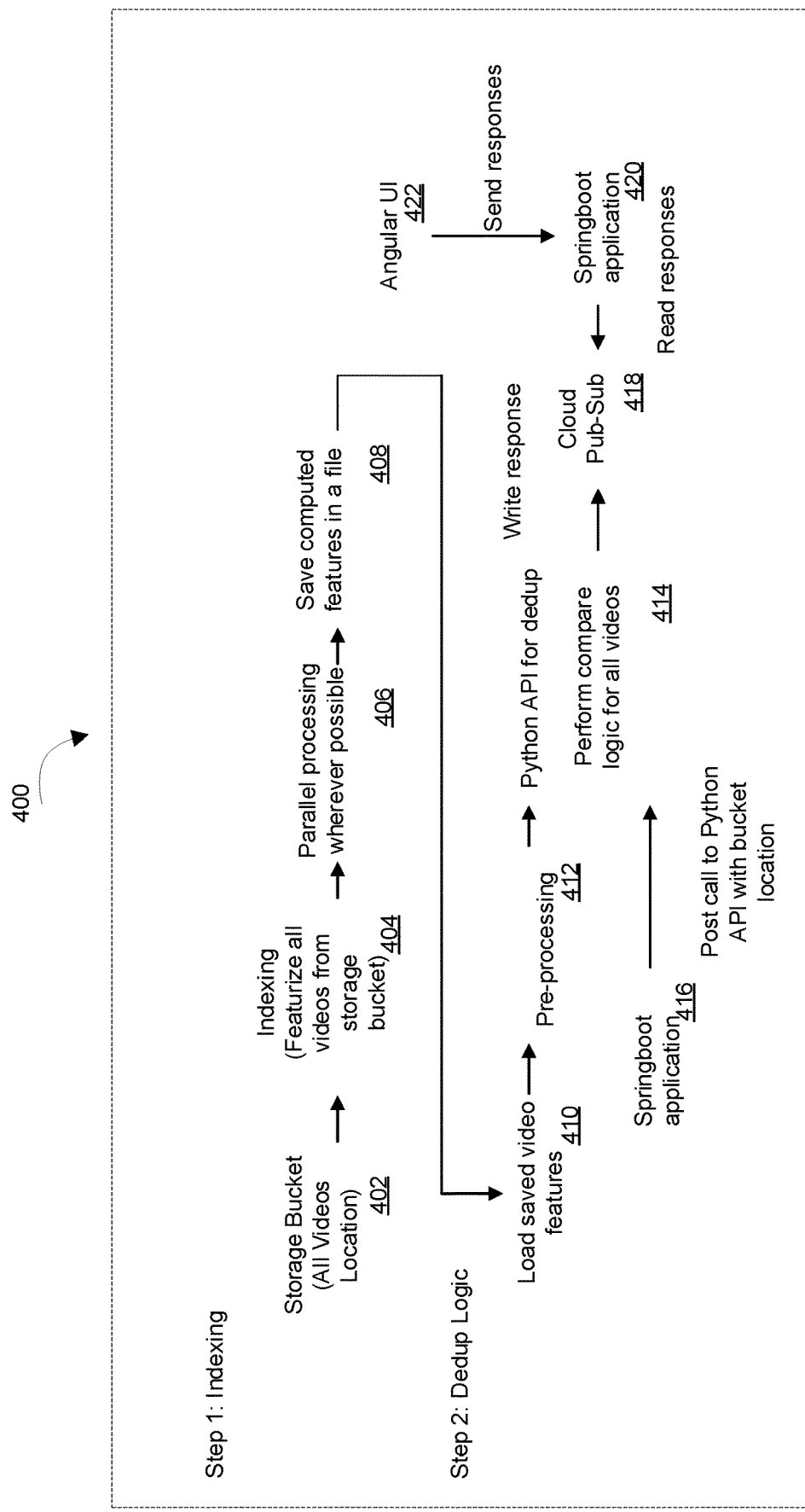
FIG. 4 illustrates a block diagram explaining parallel processing of a script execution block for content-aware deduplication of video files in accordance with an embodiment of the invention.

FIG. 4 illustrates a block diagram 400 explaining parallel processing of a script execution block for content-aware deduplication of video files in accordance with an embodiment of the invention.

As illustrated in FIG. 4, the process includes an Indexing step and Deduplication (dedup) logic application step.

The Indexing step includes accessing a storage bucket 402 which include the location of all video files. At 404, indexing is performed to extract features from all video files in storage bucket 402.

At 406, the video files are subjected to parallel processing and at 408, the computed features are saved in a file.

Moving on to the next phase (application of dedup logic), at 410, the saved features are loaded and are subjected to pre-processing at 412. Python API 414 is used for performing deduplication of the pre-processed video files by applying a compare logic for the video files. A Springboot application 416 posts a call to the Python API with the location of storage bucket 402.

Python API 414 writes the corresponding response to a cloud pub-sub system 418. Cloud pub-sub system 418 also reads responses from a Springboot application 420. Springboot application 420 then sends the responses to Angular UI 422.

Figure 5:
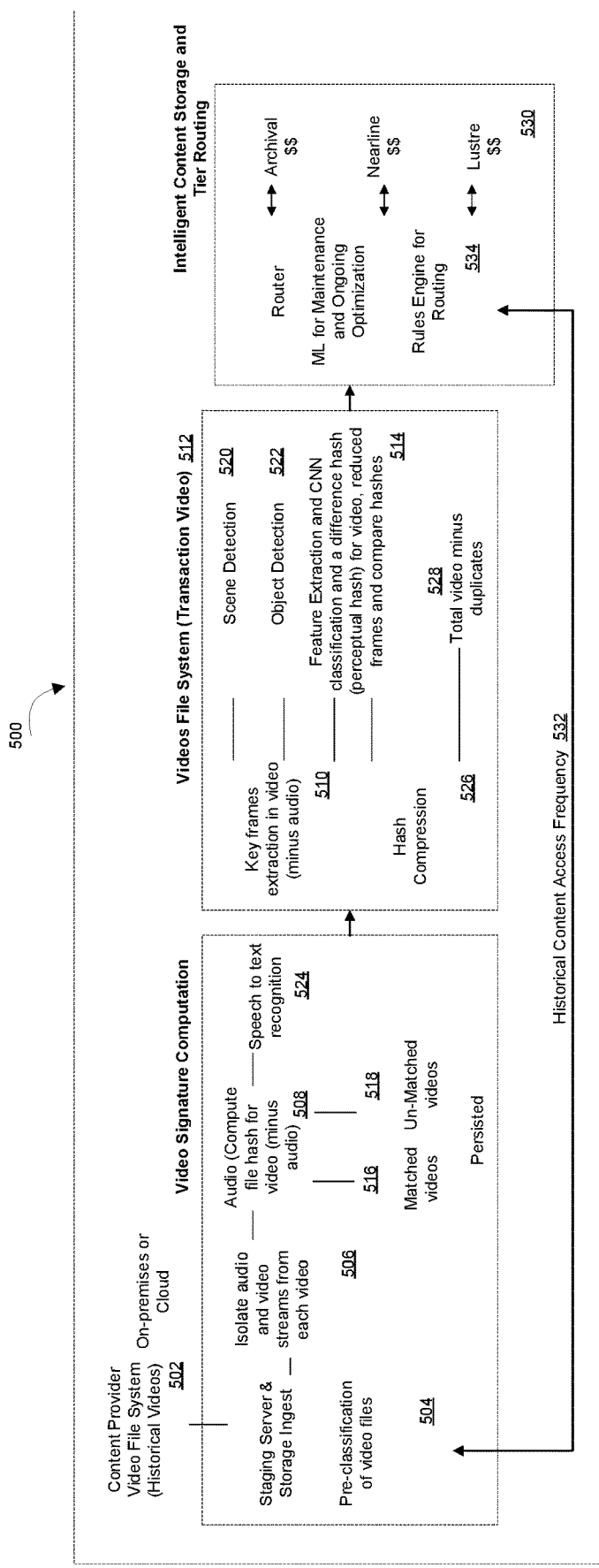
FIG. 5 illustrates in detail various components and process flow of the system for performing content-aware deduplication of video files in accordance with an exemplary embodiment of the invention.

FIG. 5 illustrates in detail various components and process flow 500 of system 100 for performing content-aware deduplication of video files in accordance with an exemplary embodiment of the invention.

As illustrated in FIG. 5, a content provider video file system 502 residing on-premises or on the cloud, stores historical videos belonging to specific categorized genres in specific file system folders. This narrows the search and computation time. Computations are done in batches at end of day (EOD) or at periodic time intervals. Further, high resolution videos are transcoded down to smaller file sizes which make them easier to handle.

504: Staging server and storage ingest: Pre-processing is applied to the files to classify the files with respect to genre (such as, but not limited to, horror, drama, comedy) and run length (for example, 1 hour, 2 hours etc.), thus lowering the CPU and GPU workload on the video to be processed.

506: For each video, audio and video streams are separated.

508: File hash is computed using a proprietary hashing method. Results are persisted for each video (minus audio). Key frames are identified for each video (minus audio) using techniques such as, but not limited to, frame differences. This results in video (minus audio) with reduced frames. New video (minus audio, reduced frames) is then persisted.

Object detection algorithm using techniques such as, but not limited to, YOLO are then applied on video (minus audio, reduced frames). Any frame in which no objects are detected is rejected. On the other hand, objects detected are persisted for each video (minus audio, reduced frames)

510: Feature extraction in videos (minus audio) is performed using techniques such as, but not limited to, Histogram of Oriented Gradients (HOG), Convolutional Neural Network (CNN), and difference hash based on adjacent pixel gradients. Any frame in which no objects are detected is rejected. A result matrix for each video (minus audio, reduced frames) is then persisted.

Transaction video 512: This is a query video. The same process as above is applied for searching against historical videos.

514: Comparison of file hashes results in some videos matched say, for example, 10%. Matched videos 516 are eliminated, and unmatched videos 518 are applied to the below algorithms.

For rest of the matches in the case of unmatched videos 518, complex algorithms such as, but not limited to, scene detection 520, and object detection 522 are applied. Machine Learning algorithms such as, but not limited to, clustering or cosine similarity are used to match against historical videos.

Optionally, algorithms such as, but not limited to, HOG, CNN or difference hash based on adjacent pixel gradients are used for extracting features. ML algorithms such as, but not limited to, clustering or cosine similarity are then used to match against historical videos.

Further, techniques such as Ideal Video Similarity (IVS) and video signature computation are used to determine similarity/match between the videos/video frames. IVS involves calculating the percentage of clusters of similar frames shared between two video sequences. For large databases (in petabytes), the volume of the intersection between clusters is calculated. On the other hand, video signature computation involves calculating the distances between corresponding frames from the two video signatures (ViSigs).

In a next step, all video names which are matched are sent to a User Interface (UI) client as a JavaScript Object Notation (JSON) response.

Audio stream portions which have been isolated from the original video are sent to a speech API of cloud computing services for speech-text conversion 524, language detection, and for extracting text captions.

Video header information is extracted using ML, and the resulting JSON is persisted for each video.

The detected conditions are then placed in a cache. When a video in a condition cache is selected, a video player plays the video at the timecode point where the detection occurred for validation.

526: The video file hashes are further compressed to reduce storage space.

528: Total video (minus duplicates) is then persisted in storage.

Intelligent content to storage tier routing 530 is then used based upon the historical access frequency of the content 532.

534: A rules engine controls the placement of content into high cost, medium cost and low-cost storage tiers, thus further optimizing storage cost. ML is used to maintain the optimization of content daily based upon current usage.

Figure 6:
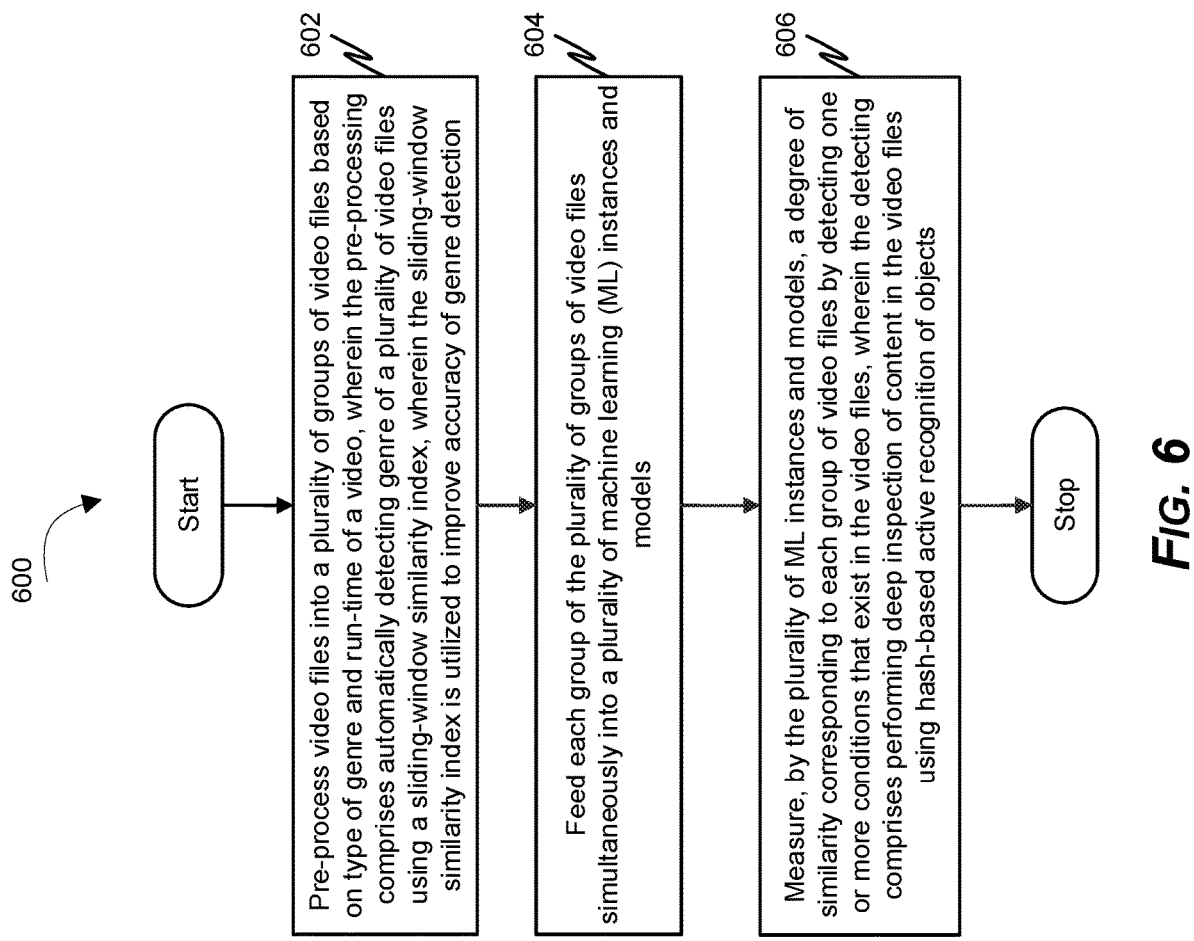
FIG. 6 illustrates a flowchart of a method for performing content-aware deduplication of video files in accordance with an embodiment of the invention.

FIG. 6 illustrates a flowchart of a method 600 for performing content-aware deduplication of video files in accordance with an embodiment of the invention.

As illustrated in FIG. 6, at step 602, pre-processing module 108 performs pre-processing of video files into a plurality of groups of video files based on type of genre and run-time of a video. The video files can be, but need not be limited to, movie files, and the genre can be, but need not be limited to, Drama, Horror and Western. The genre of a plurality of video files is automatically detected via genre detection module 110 using a sliding-window similarity index, which is utilized to improve accuracy of genre detection. In an embodiment, the genre is automatically detected using Multi-label Logistic Regression in genre detection module 110.

After the pre-processing step, at step 604, each group of the plurality of groups of video files are simultaneously fed into plurality of ML instances and models 112.

At step 606, plurality of ML instances and models 112 measure a degree of similarity corresponding to each group of video files by detecting one or more conditions that exist in the video files.

In accordance with an embodiment, a degree of similarity is measured based on the following: time code start and end points using metadata to detect the one or more conditions and visually verifying the detected one or more conditions, additional audio data using audio fingerprinting, decoding and similarity, different languages using OCR, different textual captions by, detecting the text using OCR, vectorizing the detected text, and comparing the vectorized text using cosine similarity, and video files that are recorded with different encoding equipment using metadata, different frame rates and resolutions using metadata.

In an embodiment, a threshold of plurality of ML instances and models 112 is dynamically fine-tuned for detecting the one or more conditions for each type of genre. The one or more conditions can be, but need not be limited to, additional audio content, different languages, different textual captions, recording with different encoding equipment, different frame rates and resolutions, different scene environmental locations, different scene order, different intent, blurred background, deleted frames, inserted frames, background hidden by the addition of objects, scenes with different spectral composition, different amounts of participation of a celebrity or object, and different background audio.

The one or more conditions are detected by performing deep inspection of content in the video files using hash-based active recognition of objects using content deep inspection module 114.

Hash computation module 116 then computes hashes for detecting the degree of similarity based on Hamming Distance using MD5 File Hash. The hashes are recorded on the Blockchain to prevent black box attacks using Generative Adversarial Networks (GANs).

Content deduplication module 118 then performs deduplication of video files based on the degree of similarity and the computed hashes.

Finally, content storage cost optimization module 120 which utilizes the content aware deduplication of video files to optimize storage cost organizes content maintenance for unorganized content by separating said content based on one or more categories of the video files and detecting original video files from a given set of video files. A category can be, but need not be limited to, movies, episodes/serials, trailers, user generated content, video blogs/video logs (vlogs), wildlife films, and ads.

The present invention is advantageous in that it provides storage cost optimization for content providers that are moving their content from on-premise to the cloud by enabling efficient migration and thereafter structured content upkeep. The entire storage disk/space is scanned for deduplicating data to begin with. This can be taken up in phases depending on the volume of content. Structured content upkeep is done using the deduplicated data and monthly/regular scheduled runs are performed upon stabilization thereafter.

Further, the invention identifies duplicate copies of video for content providers to decide whether they should keep the copy or delete it to save storage cost. The duplicate copies are identified by identifying where a condition was detected by time code start and end points and visually verifying the detected condition.

Furthermore, the present invention provides a content-aware discovery process that can be used by a content production person to deeply inspect content to verify that inserted content has up to date usage rights or whether additional rights need to be obtained by the content provider for distribution. Various other features/benefits of the content-aware discovery process are as follows.

The content-aware discovery process can be used to detect scenes with celebrities, objects, captions, language and perceptual differences in similar videos.

The content-aware discovery process can be used to automatically detect and remove artifacts in video such as, but not limited to, black frames, color bars, countdown slates and any abnormalities that would cause visual degradation in video quality, and for real-time video quality checking and compliance.

The content-aware discovery process can be used to extract metadata from video and write that metadata back to MAM Systems to improve the descriptive taxonomy and search capability of the MAM.

The content-aware discovery process is used for efficient and automatic content identification and verification across the content supply chain and greatly improves the identification performance of the video content.

Furthermore, the invention provides a process to reduce the hash file size using content aware variable block size compression that when decrypted produces the original hash. Thus, much higher deduplication ratios in the range of 70-85% are possible with the solution provided by the invention.

Those skilled in the art will realize that the above recognized advantages and other advantages described herein are merely exemplary and are not meant to be a complete rendering of all of the advantages of the various embodiments of the present invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of the present invention.

What is claimed is:

1. A method for performing content-aware deduplication of video files, the method comprising:
pre-processing video files into a plurality of groups of video files based on type of genre and run-time of a video, wherein the pre-processing comprises automatically detecting genre of a plurality of video files using a sliding-window similarity index, wherein the sliding-window similarity index is utilized to improve accuracy of genre detection;
feeding each group of the plurality of groups of video files simultaneously into a plurality of machine learning (ML) instances and models; and
measuring, by the plurality of ML instances and models, a degree of similarity corresponding to each group of video files by detecting at least one condition that exists in the video files, wherein the detecting comprises performing deep inspection of content in the video files using hash-based active recognition of objects.

2. The method as claimed in claim 1, wherein a video file comprises a movie and the genre is at least one of Drama, Horror and Western.

3. The method as claimed in claim 1, wherein the genre is automatically detected using Multi-label Logistic Regression.

4. The method as claimed in claim 1, wherein the measuring further comprises dynamically fine-tuning a threshold of the plurality of ML instances and models for detecting the at least one condition for each type of genre.

5. The method as claimed in claim 1, wherein a condition is at least one of additional audio content, different languages, different textual captions, recording with different encoding equipment, different frame rates and resolutions, different scene environmental locations, different scene order, different intent, blurred background, deleted frames, inserted frames, background hidden by the addition of objects, scenes with different spectral composition, different amounts of participation of a celebrity or object, and different background audio.

6. The method as claimed in claim 1, wherein a degree of similarity is measured based on time code start and end points using metadata to detect the at least one condition and visually verifying the detected at least one condition.

7. The method as claimed in claim 5, wherein a degree of similarity is measured based on additional audio data using audio fingerprinting, decoding and similarity.

8. The method as claimed in claim 5, wherein a degree of similarity is measured based on different languages using Optical Character Recognition (OCR).

9. The method as claimed in claim 5, wherein a degree of similarity is measured based on different textual captions by: detecting the text using OCR, vectorizing the detected text, and comparing the vectorized text using cosine similarity.

10. The method as claimed in claim 5, wherein a degree of similarity is measured on video files that are recorded with different encoding equipment using metadata.

11. The method as claimed in claim 5, wherein a degree of similarity is measured based on different frame rates and resolutions using metadata.

12. The method as claimed in claim 1, wherein the deep inspection of content comprises detecting scenes with celebrities, objects, captions, language, and perceptual differences in the video files.

13. The method as claimed in claim 1, wherein the deep inspection of content comprises automatically detecting and removing artifacts in a video file, wherein artifacts comprise at least one of black frames, color bars, countdown slates and any abnormalities that may cause visual degradation in video quality.

14. The method as claimed in claim 1, wherein the deep inspection of content comprises extracting metadata from a video file and writing the metadata back to a Media Asset Management (MAM) system to improve the descriptive taxonomy and search capability of the MAM system.

15. The method as claimed in claim 1, wherein the deep inspection of content is used for efficient and automatic content identification and verification across a content supply chain to greatly improve the identification and performance of video content of a video file.

16. The method as claimed in claim 1, wherein the deep inspection of content comprises verifying if any inserted content in a video file has up to date usage rights or whether additional rights need to be obtained by a content provider for distribution.

17. The method as claimed in claim 1, wherein the deep inspection of content comprises detecting and classifying disaster conditions in live video in the video files to trigger specific first responders' attention.

18. The method as claimed in claim 1, wherein the deep inspection of content comprises detecting semantic conditions in the video files, wherein a semantic condition comprises at least one of emotion and behavior.

19. The method as claimed in claim 1 further comprises computing hashes for detecting the degree of similarity based on Hamming Distance using md5 File Hash, wherein the hashes are recorded on the Blockchain to prevent black box attacks using Generative Adversarial Networks (GANs).

20. The method as claimed in claim 1, wherein the content-aware deduplication of video files achieves content storage cost optimization.

21. The method as claimed in claim 20, wherein the content storage cost optimization comprises organizing content maintenance for unorganized content by separating said content based on at least one category of the video files and detecting original video files from a given set of video files, wherein a category is at least one of movies, episodes/serials, trailers, user generated content, video blogs/video logs (vlogs), wildlife films, and advertisements (ads).

22. A system for performing content-aware deduplication of video files, the system comprising:
a memory;
a processor communicatively coupled to the memory, the processor configured to:
pre-process video files into a plurality of groups of video files based on type of genre and run-time of a video, wherein the processor is configured to automatically detect genre of a plurality of video files using a sliding-window similarity index, wherein the sliding-window similarity index is utilized to improve accuracy of genre detection;
feed each group of the plurality of groups of video files simultaneously into a plurality of machine learning (ML) instances and models; and
measure, by the plurality of ML instances and models, a degree of similarity corresponding to each group of video files by detecting at least one condition that exists in the video files, wherein the processor is configured to perform deep inspection of content in the video files using hash-based active recognition of objects.

23. The system as claimed in claim 22, wherein the genre is automatically detected using Multi-label Logistic Regression.

24. The system as claimed in claim 22, wherein the processor is further configured to dynamically fine-tune a threshold of the plurality of ML instances and models for detecting the at least one condition for each type of genre.

25. The system as claimed in claim 22, wherein a condition is at least one of additional audio content, different languages, different textual captions, recording with different encoding equipment, different frame rates and resolutions, different scene environmental locations, different scene order, different intent, blurred background, deleted frames, inserted frames, background hidden by the addition of objects, scenes with different spectral composition, different amounts of participation of a celebrity or object, and different background audio.

26. The system as claimed in claim 22, wherein a degree of similarity is measured based on time code start and end points using metadata to detect the at least one condition and visually verifying the detected at least one condition.

27. The system as claimed in claim 25, wherein a degree of similarity is measured based on additional audio data using audio fingerprinting, decoding and similarity.

28. The system as claimed in claim 25, wherein a degree of similarity is measured based on different languages using Optical Character Recognition (OCR).

29. The system as claimed in claim 25, wherein a degree of similarity is measured based on different textual captions by: detecting the text using OCR, vectorizing the detected text, and comparing the vectorized text using cosine similarity.

30. The system as claimed in claim 25, wherein a degree of similarity is measured on video files that are recorded with different encoding equipment using metadata.

31. The system as claimed in claim 25, wherein a degree of similarity is measured based on different frame rates and resolutions using metadata.

32. The system as claimed in claim 22, wherein the processor is configured to detect scenes with celebrities, objects, captions, language, and perceptual differences in the video files.

33. The system as claimed in claim 22, wherein the processor is configured to automatically detect and remove artifacts in a video file, wherein artifacts comprise at least one of black frames, color bars, countdown slates and any abnormalities that may cause visual degradation in video quality.

34. The system as claimed in claim 22, wherein the processor is configured to extract metadata from a video file and write the metadata back to a Media Asset Management (MAM) system to improve the descriptive taxonomy and search capability of the MAM system.

35. The system as claimed in claim 22, wherein the deep inspection of content is used for efficient and automatic content identification and verification across a content supply chain to greatly improve the identification and performance of video content of a video file.

36. The system as claimed in claim 22, wherein the processor is configured to verify if any inserted content in a video file has up to date usage rights or whether additional rights need to be obtained by a content provider for distribution.

37. The system as claimed in claim 22, wherein the processor is configured to detect and classify disaster conditions in live video in the plurality of video files to trigger specific first responders' attention.

38. The system as claimed in claim 22, wherein the processor is configured to detect semantic conditions in the plurality of video files, wherein a semantic condition comprises at least one of emotion and behavior.

39. The system as claimed in claim 22, wherein the processor is further configured to compute hashes for detecting the degree of similarity based on Hamming Distance using md5 File Hash, wherein the hashes are recorded on the Blockchain to prevent black box attacks using Generative Adversarial Networks (GANs).

40. The system as claimed in claim 22, wherein the content-aware deduplication of video files achieves content storage cost optimization.

41. The system as claimed in claim 40, wherein the processor is configured to organize content maintenance for unorganized content by separating said content based on at least one category of the video files and detect original video files from a given set of video files, wherein a category is at least one of movies, episodes/serials, trailers, user generated content, video blogs/video logs (vlogs), wildlife films, and advertisements (ads).

* * * * *